United States Patent
Ridgway et al.

(10) Patent No.: US 8,916,988 B2
(45) Date of Patent: Dec. 23, 2014

(54) SYSTEMS AND METHODS FOR USE IN OPERATING POWER GENERATION SYSTEMS

(71) Applicant: General Electric Company, Schenectady, NY (US)

(72) Inventors: Robert William Ridgway, Schenectady, NY (US); Minesh Ashok Shah, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 147 days.

(21) Appl. No.: 13/658,507

(22) Filed: Oct. 23, 2012

(65) Prior Publication Data

US 2014/0110940 A1    Apr. 24, 2014

(51) Int. Cl.
F03D 9/00    (2006.01)

(52) U.S. Cl.
USPC .................................................. 290/55

(58) Field of Classification Search
USPC .................................................. 290/44, 55
See application file for complete search history.

(56) References Cited

U.S. PATENT DOCUMENTS

| 3,786,695 A | 1/1974 | Barrett, Jr. | |
| 2013/0028740 A1* | 1/2013 | Koehnke et al. | 416/147 |

FOREIGN PATENT DOCUMENTS

| CN | 201671762 U | 12/2010 |
| EP | 1860321 A2 | 11/2007 |
| WO | 2011110429 A2 | 9/2011 |
| WO | 2012061953 A1 | 5/2012 |

OTHER PUBLICATIONS

European Search Report and Opinion issued in connection with corresponding EP Application No. 13189117.8 on Sep. 2, 2014.

* cited by examiner

Primary Examiner — Tho D Ta
(74) Attorney, Agent, or Firm — Armstrong Teasdale LLP

(57) ABSTRACT

A control system is provided. The control system includes a turbine controller that is configured to generate at least a first signal that is representative of pitch control commands for a plurality of turbine blades and a second signal that is representative of the pitch control commands for the turbine blades. A first pitch controller is coupled to the turbine controller, wherein the first pitch controller is configured to receive the first signal and to implement the pitch control commands for each of the turbine blades in response to receiving the first signal. A second pitch controller is coupled to the turbine controller and to the first pitch controller, wherein the second pitch controller is configured to receive the second signal and to implement the pitch control commands to each of the turbine blades when the first pitch controller is unable to implement the pitch control commands.

20 Claims, 2 Drawing Sheets

SYSTEMS AND METHODS FOR USE IN OPERATING POWER GENERATION SYSTEMS

BACKGROUND OF THE INVENTION

The field of the invention relates generally to power generation systems and, more particularly, to systems and methods for use in operating power generation systems.

At least some known power generation systems include turbines, such as wind turbines, to generate power. For example, at least some known wind turbines convert the kinetic energy of wind into electrical energy. Known wind turbines include one or more blades that rotate when wind strikes the blades. The flow of wind over each turbine blade generates a lift, induces rotation, and provides a torque to generate power.

At least some known wind turbines include at least one control system, such as a pitch control system. The pitch control system may include a plurality of controllers that communicate with each other to control components of the wind turbine. One type of controller is a pitch controller, and at least some known wind turbines includes a plurality of pitch controllers that are each coupled to a respective blade to enable changes in a pitch angle of the respective blade. More specifically, to facilitate enhanced operation, each pitch controller may drive a respective blade to a desired operating pitch angle based on existing wind conditions and/or in response to a desired power generation. Each pitch controller may also rotate a respective blade to a non-operating or feathered position to facilitate reducing the amount of lift induced to the blades from the wind. The blades may also be feathered to prevent damage to the wind turbine, for example, during high wind conditions or during wind turbine fault conditions.

Another type of controller is a turbine controller that may function as a master controller for the wind turbine system. For example, a known turbine controller may control each pitch controller. In such configurations, the turbine controller issues commands or control messages to each pitch controller, and, in response, the pitch controllers implement these commands or control messages on respective blades. For example, the turbine controller may issue commands to each pitch controller to rotate respective blades to a defined position.

However, known pitch controllers and the turbine controller may suffer periodic losses of communication with each other. Moreover, known pitch controllers and/or the turbine controller may incur a malfunction or have a defect when at least one of the controllers is inoperable. Such communication losses and/or inoperability of one of the controllers may cause undesirable consequences. For example, when a loss of communication occurs between just one pitch controller and the turbine controller, and/or when just one of the components is inoperable, known wind turbines may enter a fault state in which a hard-braking procedure is implemented and all associated rotor blades are stopped via mechanical braking and/or through battery-driven braking procedures. For example, mechanical braking may be applied to the turbine that is stopped and the blades may be stopped by feathering the blades (i.e., blades out of the wind). Such procedures may induce an undesirable amount of loading upon the wind turbine system and over time, may reduce the operating life of the wind turbine. In addition to undesired loading of the turbine and corresponding structure, the emergency braking also adversely impacts turbine availability thus reducing power generation (i.e., value of the wind turbine).

BRIEF DESCRIPTION OF THE INVENTION

In one embodiment, a control system is provided. The control system includes a turbine controller that is configured to generate at least a first signal that is representative of a plurality of pitch control commands for a plurality of turbine blades and a second signal that is representative of the pitch control command for the turbine blades. A first pitch controller is coupled to the turbine controller, wherein the first pitch controller is configured to receive the first signal and to implement the pitch control commands for each of the turbine blades in response to receiving the first signal. A second pitch controller is coupled to the turbine controller and to the first pitch controller, wherein the second pitch controller is configured to receive the second signal and to implement the pitch control commands to each of the turbine blades when the first pitch controller is unable to implement the pitch control commands.

In another embodiment, a power generation system is provided. The power generation system includes a turbine that includes a plurality of blades that are configured to rotate in at least one direction. A control system is coupled to the turbine, wherein the control system includes a turbine controller that is configured to generate at least a first signal that is representative of a plurality of pitch control commands for the blades and a second signal that is representative of the pitch control commands for the blades. A first pitch controller is coupled to the turbine controller, wherein the first pitch controller is configured to receive the first signal and to implement the pitch control commands to each of the blades in response to receiving the first signal. A second pitch controller is coupled to the turbine controller and to the first pitch controller, wherein the second pitch controller is configured to receive the second signal and to implement the pitch control commands to each of the blades when the first pitch controller is unable to implement the pitch control commands.

In yet another embodiment, a method for operating a power generation system is provided. At least a first signal that is representative of a plurality of pitch control commands for a plurality of turbine blades and a second signal that is representative of the pitch control commands for the turbine blades are generated via a turbine controller. The first signal is transmitted to a first pitch controller that is coupled to the turbine controller, wherein the first pitch controller is configured to implement the pitch control commands to each of the turbine blades in response to receiving the first signal. The second signal is transmitted to a second pitch controller that is coupled to the turbine controller and to the first pitch controller, wherein the second pitch controller is configured to implement the pitch control commands to each of the turbine blades when the first pitch controller is unable to pitch the control commands.

DETAILED DESCRIPTION OF THE INVENTION

The exemplary systems and methods described herein overcome at least some known disadvantages associated with at least some known power generation systems that use turbines, such as wind turbines. The embodiments described herein include a control system that includes a first or primary pitch controller, and a secondary or back-up pitch controller that each implements pitch control commands for the same turbine blades. More specifically, the exemplary control system includes a turbine controller that transmits signals representative of pitch control commands to both the main and back-up pitch controllers. As such, while the main pitch controller may transmit signal(s) of pitch control commands to a plurality of motor drives to pitch the turbine blades, the back-up pitch controller may also be able to transmit signal(s) of the pitch control commands to the motor drives when the main pitch controller is inoperable and/or is unable to communicate with the motor drives. As a result, the power generation system will continue to operate as the turbine is substantially prevented from entering a fault state in which an emergency or hard-braking procedure is implemented. Accordingly, an undesirable amount of loading upon the turbine is substantially prevented and the operating life of the turbine is not adversely effected. In addition, because the emergency braking procedure is prevented from being implemented, turbine availability is not adversely effected and power generation may not be reduced.

Figure 1:
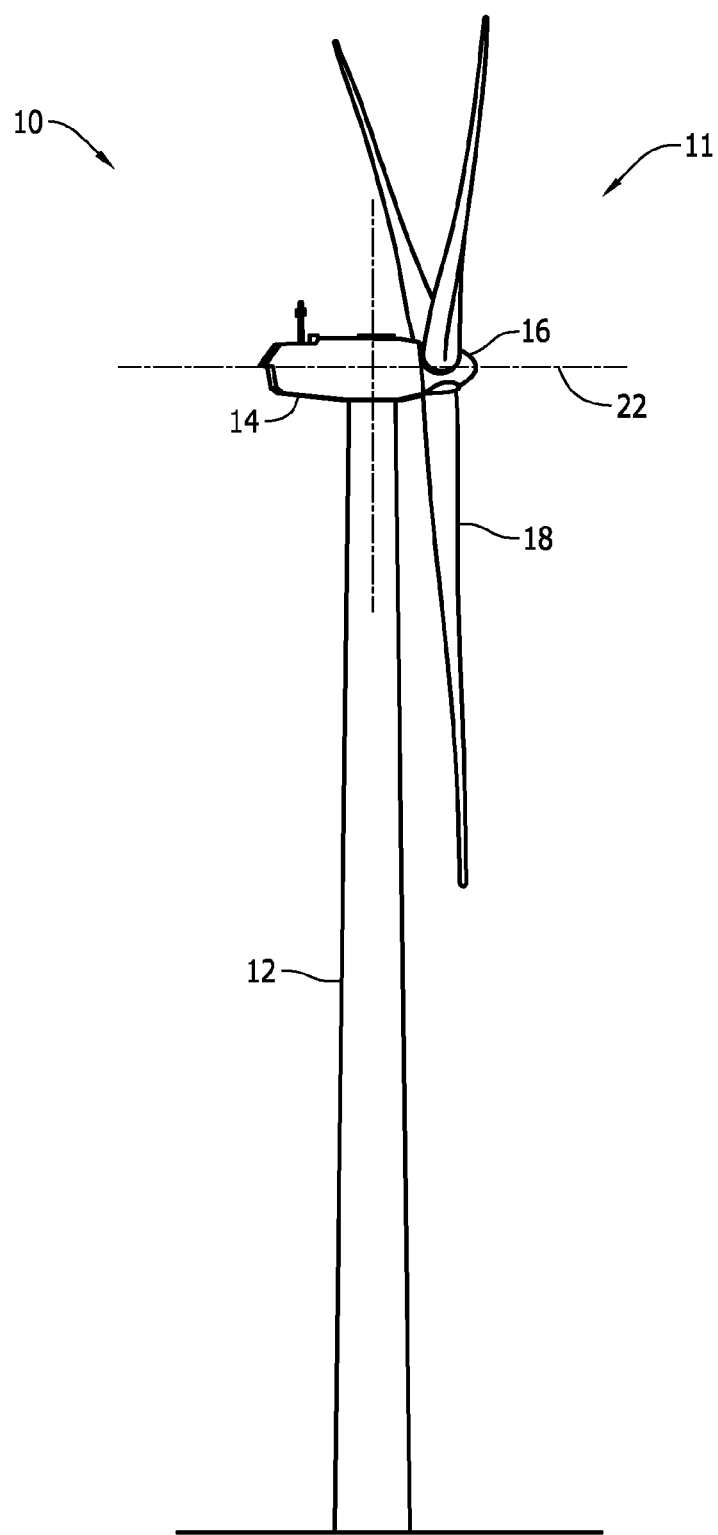
FIG. 1 is a side view schematic of an exemplary power generation system.

FIG. 1 illustrates an exemplary power generation system 10 that includes a turbine 11. More specifically, in the exemplary embodiment, turbine 11 is a wind turbine. Although the exemplary embodiment illustrates a power generation system, the present disclosure is not limited to power generation systems, and one of ordinary skill in the art will appreciate that the current disclosure may be used in connection with any other type of system. Moreover, while the exemplary embodiment includes a wind turbine, the present invention is not limited to any one particular type of turbine, and one of ordinary skill in the art will appreciate that the current disclosure may be used in connection with other turbine systems.

In the exemplary embodiment, wind turbine 11 includes a tower 12, a nacelle 14 coupled to tower 12, a hub 16 coupled to nacelle 14, and at least one blade 18 that is coupled to hub 16. More specifically, in the exemplary embodiment, wind turbine 11 includes three blades 18. Alternatively, wind turbine 11 may include any number of blades that enables power generation system 10 to function as described herein. In the exemplary embodiment, tower 12 is configured to provide support for nacelle 14, hub 16, and blade 18. Tower 12 may be of any suitable height and construction as is known in the art and that enables power generation system 10 to function as described herein. It should be noted that, as used herein, the term "couple" is not limited to a direct mechanical, thermal, communication, and/or an electrical connection between components, but may also include an indirect mechanical, thermal, communication and/or electrical connection between multiple components.

Nacelle 14 is coupled to tower 12 and nacelle 14 houses components (not shown) that are used for transforming rotational energy provided by blades 18 into electricity. Nacelle 14 may be constructed by any suitable method that is known in the art. In the exemplary embodiment, hub 16 is coupled to nacelle 14 to provide a rotatable housing for at least one blade 18. Hub 16 may be constructed by any suitable method that is known in the art.

In the exemplary embodiment, blades 18 are also coupled to hub 16, such that each blade 18 is rotatable about an axis of rotation 22 when wind strikes blades 18. In the exemplary embodiment, each blade 18 is oriented substantially perpendicularly with respect to the ground. Moreover, each blade 18 rotates through substantially the same plane of rotation and each is substantially parallel to a centerline axis 20 of tower 12. Each blade 18 may be constructed by any suitable method that is known in the art. In the exemplary embodiment, a control system (not shown in FIG. 1) is coupled to turbine 11. More specifically, in the exemplary embodiment, the control system is a pitch control system for turbine 11.

During operation, as wind strikes blades 18, blades 18 rotate about hub 16, and the kinetic energy of the wind is transformed into rotational energy by blades 18. More specifically, a rotation of blades 18 rotates a gearbox (not shown) within nacelle 14. A generator (not shown) housed within nacelle 14 generates electricity. The cable assembly may deliver the electricity to a power grid (not shown) or other destination. As described in more detail below, during operation of wind turbine 11, the control system operates power generation system 10 by controlling turbine pitch such that turbine 11 is substantially prevented from entering a fault state in which a hard braking procedure is implemented. As such, an undesirable amount of loading induced upon wind turbine 11 is substantially prevented and the operating life of turbine 11 may not be adversely effected. In addition, because the emergency braking procedure is prevented from being implemented, turbine 11 availability is not adversely effected and power generation may not be reduced.

Figure 2:
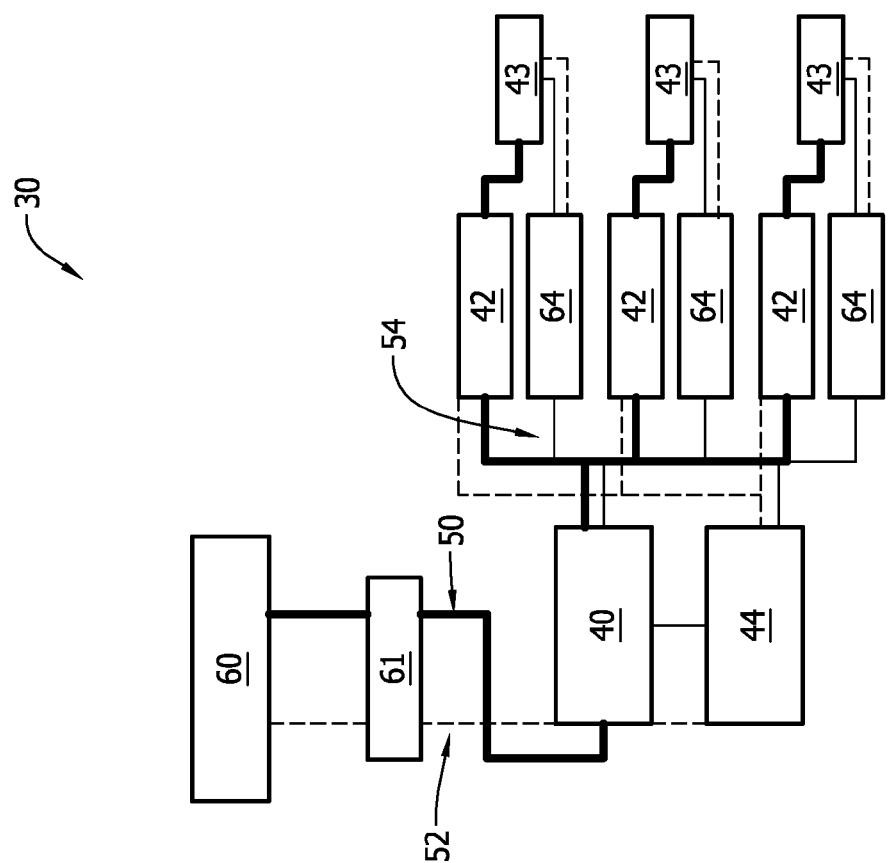
FIG. 2 is a block diagram of an exemplary control system that may be used with the power generation system shown in FIG. 1.

FIG. 2 illustrates an exemplary control system 30 that may be used with power generation system 10 (shown in FIG. 1). In the exemplary embodiment, control system 30 includes components housed within hub 16 (shown in FIG. 1), nacelle 14 (shown in FIG. 1), blades 18 (shown in FIG. 1), and/or tower 12 (shown in FIG. 1). More specifically, in the exemplary embodiment, control system 30 includes a first or primary pitch controller 40 that is housed within hub 16 and that controls, for example, a pitch angle (not shown) and/or a relative position (not shown) of blades 18. In the exemplary embodiment, pitch controller 40 includes a microprocessor. In an alternative embodiment, pitch controller 40 may include a programmable logic controller (PLC), a microcontroller, a field programmable gate array (FPGA) or any other suitable programmable circuit that enables pitch controller 40 to operate as described herein. As used herein, the term "control" includes, but is not limited to only, issuing commands to be implemented by exercising oversight and supervision of, and/ or directing operation of, one or more subject components. The term "control" also includes a regulation-type of control, e.g. a feedback-loop regulation.

Primary pitch controller 40 is coupled to at least one pitch or motor drive 42. More specifically, in the exemplary embodiment, primary pitch controller 40 is coupled to three motor drives 42, and each motor drive 42 is coupled to a respective motor 43. In the exemplary embodiment, three motors 43 are illustrated, wherein each motor 43 is coupled to one blade 18 such that each motor 43 may rotate respective blade 18 using, for example, hydraulic, electric, or gear-driven means. Alternatively, control system 30 may include any suitable number of motors 43.

Primary pitch controller 40 is coupled to each blade 18 through a respective motor drive 42 and through a respective motor 43, such that primary pitch controller 40 can selectively transmit signal(s) to motor drive 42 and/or to motor 43. For example, primary pitch controller 40 may selectively transmit a signal to motor 43 such that power from a motor drive 42 or backup batteries 64 may operate motor 43. Various connections are available between primary pitch controller 40 and motor drive 42 and/or motor 43. Such connections may include, without limitation, an electrical conductor, a low-level serial data connection, such as Recommended Standard (RS) 232 or RS-485, a high-level serial data connection, such as Universal Serial Bus (USB), CAN and Ethernet Global Data (EGD), a field bus, a process field bus (PROFIBUS®), or Institute of Electrical and Electronics Engineers (IEEE®) 1394, a parallel data connection, such as IEEE® 1284 or IEEE® 488, a short-range wireless communication channel such as BLUETOOTH®, and/or a private (e.g., inaccessible outside power generation system 10) network connection, whether wired or wireless. IEEE is a registered trademark of the Institute of Electrical and Electronics Engineers, Inc., of New York, N.Y. BLUETOOTH is a registered trademark of Bluetooth SIG, Inc. of Kirkland, Wash. PROFIBUS is a registered trademark of Profibus Trade Organization of Scottsdale, Ariz. For example, in the exemplary embodiment, pitch controller 40 communicates with motor drive 42 and/or motor 43 via a communication network 50.

In the exemplary embodiment, control system 30 includes a secondary or back-up pitch controller 44 that is also housed within hub 16 and that also controls, for example, the pitch angle and/or the relative position of blades 18. In the exemplary embodiment, back-up pitch controller 44 includes a microprocessor. In an alternative embodiment, back-up pitch controller 44 may include a FPGA, a microcontroller, a PLC or any other suitable programmable circuit that enables pitch controller 40 to operate as described herein.

Back-up pitch controller 44 is coupled to primary pitch controller 40. In addition, back-up pitch controller 44 is also coupled to each blade 18 through a respective motor drive 42 and through a respective motor 43 such that back-up pitch controller 44 can selectively transmit signal(s) to motor drive 42 and/or motor 43. Various connections are available between back-up pitch controller 44 and motor drive 42 and/or motor 43. Such connections may include, without limitation, an electrical conductor, a low-level serial data connection, such as RS-232 or RS-485, a high-level serial data connection, such as USB, a field bus, a PROFIBUS®, or IEEE® 1394, a parallel data connection, such as IEEE® 1284 or IEEE® 488, a short-range wireless communication channel such as BLUETOOTH®, and/or a private (e.g., inaccessible outside power generation system 10) network connection, whether wired or wireless. For example, in the exemplary embodiment, back-up pitch controller 44 communicates with motor drive 42 and/or motor 43 via a communication network 52.

Control system 30 also includes a turbine controller 60 that is housed within tower 12. Alternatively, turbine controller 60 may be located within another portion of turbine 11, such as nacelle 14. Turbine controller 60 is coupled to primary pitch controller 40 and to back-up pitch controller 44. Moreover, in the exemplary embodiment, turbine controller 60 is configured to operate as a master controller of turbine 11 and of control system 30, and may include a computer or other processor configured to execute control algorithms. As used herein, the term "processor" includes any programmable system including systems and microcontrollers, reduced instruction set circuits (RISC), application specific integrated circuits (ASIC), PLC, and any other circuit capable of executing the functions described herein. The above examples are exemplary only, and thus are not intended to limit in any way the definition and/or meaning of the term processor.

Turbine controller 60 may control other controllers of turbine 11 by transmitting signals to the other controllers via a communication network. For example, turbine controller 60 may control pitch controllers 40 and 44 by transmitting command signals to pitch controllers 40 and 44 via communication networks 50 and 52, respectively. Turbine controller 60 may also communicate with other wind turbines (not shown) and/or a wind farm management system (not shown), and perform error handling and operational optimization. Moreover, turbine controller 60 may execute a SCADA (Supervisory, Control and Data Acquisition) program.

Control system 30 also includes a connection device 61 that is coupled to turbine controller 60 and to pitch controllers 40 and 44. In the exemplary embodiment, connection device 61 is a slip ring that enables communication between turbine controller 60 and pitch controllers 40 and 44. For example, communication networks 50 and 52 may use connection device 61 to facilitate channeling or transmitting signals from turbine controller 60 to respective pitch controllers 40 and 44 via a serial communication protocol or another communication protocol, such as broadband over power line (BPL). Contactless communication may also be used, such as infrared or a light emitting diode (LED).

Each motor drive 42 and motor 43, in the exemplary embodiment, is coupled to at least one backup battery 64. Each backup battery 64 may include a battery (not shown) that provides backup electrical power to components within hub 16, nacelle 14, and tower 12 components in the event of, for example, a communication loss. Moreover, in the exemplary embodiment, each backup battery 64 includes a communication module (not shown) that is coupled to pitch controllers 40 and 44 and/or to turbine controller 60 such that each backup battery 64 may communicate with pitch controllers 40 and 44 and/or turbine controller 60 via a communication network 54. For example, each backup battery 64 may transmit a charge status of each respective battery to turbine controller 60.

Moreover, nacelle 14 may include a brake (not shown) and a gearbox (not shown). For example, the gearbox may enable an augmentation of a rotation of a main rotor shaft (not shown) driven by the rotation of blades 18 to increase the speed of a generator (not shown). The brake may provide emergency stopping power to the generator and/or to turbine operation in an event of a fault or other error condition. For example, turbine controller 60 may transmit a signal to use the brake to pitch controllers 40 and 44. Pitch controllers 40 and 44 may transmit the brake signal to other components, such as to motors 43 via communication network 54.

During operation, rotation of blades 18 causes rotation of the main rotor shaft, resulting in electricity being produced by the generator. Turbine controller 60 monitors the rotational speed and loading of blades 18 using, for example, blade and/or hub sensors (not shown). When the wind speed exceeds a rated speed of turbine 11, for example, turbine controller 60 may generate signal(s) that are representative of pitch control commands for blades 18 and transmits the signal(s) to controllers 40 and 44 either in an analog form or in a digital form. More specifically, in the exemplary embodiment, turbine controller 60 generates at least two signals that are each representative of the same pitch control command to increase or decrease the pitch angle of blades 18 as necessary to facilitate reducing or increasing the lift induced to blades 18 by the wind. Turbine controller 60 transmits one signal to primary pitch controller 40 via communication network 50 and the other signal to back-up pitch controller 44 via communication network 52. Turbine controller 60 may transmit both signals simultaneously to each pitch controller 40 and 44. Alternatively, turbine controller 60 may transmit each signal at different times to each pitch controller 40 and 44. For example, primary pitch controller 40 may receive a signal before back-up pitch controller 44.

When primary pitch controller 40 receives the signal representative of the pitch control command, primary pitch controller 40 implements the pitch control command by transmitting signals to each motor drive 42 in analog form or in digital form. When each motor drive 42 receives a signal, each motor drive 42 processes the signal. For example, each motor drive 42 may convert the signal in analog or digital form to a power signal. Each motor drive 42 can then transmit the power signal to respective motors 43 such that each motor 43 may power respective blades 18 to rotate blades 18 by an amount specified in the pitch control command. For example, blades 18 may be rotated to a pitch angle specified by primary pitch controller 40.

In the exemplary embodiment, control system 30 relies at least partially upon communication network 50 for communication between turbine controller 60 and primary pitch controller 40. However, if communication network 50 is error-prone, or if one or more components of primary pitch controller 40 and/or of turbine controller 60 are error-prone or faulty, a loss of communication between turbine controller 60 and primary pitch controller 40 and/or a loss of communication between primary pitch controller 40 and each motor drive 42 may result. Accordingly, primary pitch controller 40 is unable to implement the pitch control command. As used herein, the term "communication loss" includes unreliable or broken data and/or control communication conditions between the respective components, and also includes communication failures, such as for example, due to hardware failure, software failure, and/or network failure, and unstable communication between the components. For example, a communication loss may result from one or more lost or corrupted signals or packets of data from communication networks 50 and 52, or from a reduction or an increase of signal strength in one or more signals in communication networks 50 and 52. As used herein, a "communication loss" may also result from a loss of electrical power between two components. Moreover, a communication loss may occur due to a failure in pitch controllers 40 and 44, in turbine controller 60, and/or in any other component used in communication networks 50 and 52.

When primary pitch controller 40 is unable to implement the pitch control command, control system 30 utilizes back-up pitch controller 44 to substantially prevent turbine 11 from entering a fault state in which a hard braking procedure is implemented. For example, since the same pitch control command was transmitted by turbine controller 60 to back-up pitch controller 44, the pitch control command can be transmitted, via back-up pitch controller 44, to each motor drive 42 such that each motor drive 42 may transmit a signal to respective motors 43 to rotate blades 18 by the amount specified by the pitch control command.

Moreover, in the exemplary embodiment, each motor drive 42 is configured to selectively receive signals from primary pitch controller 40 or back-up pitch controller 44 based on various factors that contribute to communication loss, such as, but not limited to, an error message, an overly delayed message, an out of range message, or an illegal message. For example, in the exemplary embodiment, primary pitch controller 40 may detect a communication issue or loss with turbine controller 60 such that each motor drive 42 and/or primary pitch controller 40 may become unresponsive. As a result, backup pitch controller 44 will provide the pitch control command signal to each motor drive 42 and transmit a signal to turbine controller 60 that backup pitch controller 44 has been selected for implementing the pitch control commands. Alternatively, each motor drive 42 may be configured to detect a communication issue or loss from primary pitch controller 40. As a result, motor drive 42 will receive the pitch control command signal from back-up pitch controller 44 and transmit a signal to each of the pitch controllers 40 and 44 that the backup pitch controller 44 has been selected for imple-menting control parameters. Alternatively, turbine controller 60 may transmit signals via any other suitable method that enables power generation system 10 and/or control system 30 to function as described herein. For example, in one embodiment, turbine controller 60 may determine which pitch controller to use based on communication issues and/or feedback signals that turbine controller 60 receives.

In another embodiment, control system 30 may have each motor drive 42 initially receiving signals from back-up pitch controller 44 such that back-up pitch controller 44 is implementing the pitch control commands by transmitting signals to each motor drive 42. In such an embodiment, control system 30 relies at least partially upon communication network 52 for communication between turbine controller 60 and back-up pitch controller 44. However, if communication network 52 is error-prone, or if one or more components of back-up pitch controller 44 and/or of turbine controller 60 are error-prone or faulty, a loss of communication between turbine controller 60 and back-up pitch controller 44 and/or a loss of communication between back-up pitch controller 44 and each motor drive 42 may result. As such, back-up pitch controller 44 is unable to implement the pitch control commands. Control system 30 will then utilize primary pitch controller 40 to substantially prevent turbine 11 from entering a fault state in which a hard braking procedure is implemented. More specifically, since the same pitch control command was transmitted by turbine controller 60 to primary pitch controller 40, the pitch control command can be transmitted, via primary pitch controller 40, to each motor drive 42 such that each motor drive 42 may transmit a signal to respective motors 43 to rotate blades 18 by the amount specified by the control commands.

In such an embodiment, for example, back-up pitch controller 44 may detect a communication issues or loss with turbine controller 60 such that each motor drive 42 and/or back-up pitch controller 44 may become unresponsive. As a result, primary pitch controller 40 will provide the pitch control command signal to each motor drive 42 and transmit a signal to turbine controller 60 that primary pitch controller 40 has been selected for implementing the pitch control commands. Alternatively, each motor drive 42 may be configured to detect a communication issue or loss from back-up pitch controller 44. Then each motor drive 42 will receive the pitch control command signal from primary pitch controller 40 and transmit to each of the pitch controllers 40 and 44 that the primary pitch controller 40 has been selected for implementing the pitch control commands. Alternatively, turbine controller 60 may transmit signals via any other suitable method that enables power generation system 10 and/or control system 30 to function as described herein.

In one embodiment, turbine controller 60 may transmit command signals to primary pitch controller 40 and primary pitch controller 40 transmits command signals to motor drive 42. After receiving the command signals, each motor drive 42 may respond by transmitting a signal to primary pitch controller 40, wherein the response signal represents that the command signals have been received and properly responded to (i.e., feedback signal). Primary pitch controller 40 may then transmit a signal to turbine controller 60 that all communication was received by primary pitch controller 40 and/or motor drive 42. If no signal is received by turbine controller 60 or if an error signal is received by turbine controller 60, then turbine controller 60 may switch to back-up pitch controller 44. For back-up control, turbine controller 60 may transmit command signals to the back-up pitch controller 44 and the back-up pitch controller 44 transmits command signals to each motor drive 42. After receiving the command signals, each motor drive 42 may respond by transmitting a signal to back-up pitch controller 44, wherein the response signal represents that the command signals have been received and properly responded to (i.e., feedback signal). Back-up pitch controller 44 may then transmit a signal to turbine controller 60 that all communication was received and appropriately responded to by back-up pitch controller 44 and/or each motor drive 42. If no signal is received by turbine controller 60 or if an error signal is received by turbine controller 60, then turbine controller 60 may switch to primary pitch controller 40. Turbine controller 60 may receive similar feedback signals from back-up pitch controller 44, in which case turbine controller 60 may transmit command signals to primary pitch controller 40.

As compared to known power generation systems that use turbines, such as wind turbines, the embodiments described herein provide a control system that substantially prevents the operating life of the turbine from being adversely effected. The control system includes a first or primary pitch controller, and a secondary or back-up pitch controller that each implements pitch control commands for the turbine blades. More specifically, the exemplary control system includes a turbine controller that transmits signals representative of pitch control commands to both the main and back-up pitch controllers. As such, while the main pitch controller may transmit signal(s) of the pitch control commands to a plurality of motor drives to pitch the turbine blades, the back-up pitch controller may also be able to transmit signal(s) of the pitch control commands to the motor drives when the main pitch controller is inoperable and/or is unable to communicate with the motor drives. As a result, the power generation system will continue to operate as the turbine is substantially prevented from entering a fault state in which a hard-braking procedure is implemented. Accordingly, the exemplary control system prevents the operating life of the turbine from being adversely effected and improves turbine availability.

A technical effect of the systems and methods described herein includes at least one of: (a) generating, via a turbine controller, at least a first signal that is representative of a plurality of pitch control commands for a plurality of turbine blades and a second signal that is representative of the pitch control commands for the plurality of turbine blades; (b) transmitting a first signal to a first pitch controller that is coupled to a turbine controller, wherein the first pitch controller is configured to implement a plurality of pitch control commands to a plurality of turbine blades in response to receiving a first signal; and (c) transmitting a second signal to a second pitch controller that is coupled to a turbine controller and to a first pitch controller, wherein the second pitch controller is configured to implement a plurality of pitch control commands to a plurality of turbine blades when a first pitch controller is unable to implement the pitch control commands.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and is not limited to practice with only the systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a power generation system, wherein the power generation system comprises a plurality of turbine blades coupled to a hub, a plurality of motors, and a plurality of motor drives, wherein each motor is coupled to a corresponding one of the plurality of turbine blades and to a corresponding one of the plurality of motor drives, said control system comprising:
    a turbine controller configured to generate at least a first signal that is representative of a pitch control command to change a pitch angle of the plurality of turbine blades and a second signal that is representative of the pitch control command;
    a first pitch controller coupled to said turbine controller, said first pitch controller configured to receive the first signal and to implement the pitch control command by transmitting a corresponding primary motor drive signal to each of the plurality of motor drives in response to receiving the first signal; and
    a second pitch controller coupled to said turbine controller and to said first pitch controller, said second pitch controller is configured to receive the second signal and to implement the pitch control command by transmitting a corresponding secondary motor drive signal to each of the plurality of motor drives in response to receiving the second signal when said first pitch controller is unable to implement the pitch control command.

2. A control system in accordance with claim 1, wherein said turbine controller is configured to:
    receive a plurality of feedback signals from at least one of said first pitch controller and said second pitch controller; and
    determine when to transmit one of the first signal and the second signal to said first pitch controller and to said second pitch controller, respectively, based on the plurality of feedback signals.

3. A control system in accordance with claim 1, wherein each of said plurality of motor drives selectively receives one of the first signal and the second signal.

4. A control system in accordance with claim 3, wherein each of the plurality of motor drives selectively receives one of the first signal and the second signal based on a communication loss.

5. A control system in accordance with claim 1, wherein each of said first and second pitch controllers are configured to determine which one of said first pitch controller and said second pitch controller implements the pitch control command.

6. A control system in accordance with claim 5, wherein each of said first and second pitch controllers are configured to make the determination based on an assessment of the communication between each of said first and second pitch controllers and at least one of said turbine controller and the plurality of motor drives.

7. A control system in accordance with claim 6, wherein at least one of said first pitch controller and said second pitch controller transmits a signal representative of the implementation determination to said turbine controller.

8. A power generation system comprising:
   a turbine comprising a plurality of blades that are configured to rotate in at least one direction;
   a plurality of motor drives:
   a plurality of motors, each said motor is coupled to a corresponding one of said plurality of blades and to a corresponding one of said plurality of motor drives; and
   a control system coupled to said turbine, wherein said control system comprises:
   a turbine controller configured to generate at least a first signal that is representative of a pitch control command to change a pitch angle of said plurality of blades and a second signal that is representative of the pitch control command;
   a first pitch controller coupled to said turbine controller, said first pitch controller configured to receive the first signal and to implement the pitch control command by transmitting a corresponding primary motor drive signal to each of said plurality of motor drives in response to receiving the first signal; and
   a second pitch controller coupled to said turbine controller and to said first pitch controller, said second pitch controller is configured to receive the second signal and to implement the pitch control command by transmitting a corresponding secondary motor drive signal to each of said plurality of motor drives in response to receiving the second signal when said first pitch controller is unable to implement the pitch control command.

9. A power generation system in accordance with claim 8, wherein said turbine controller is configured to:
   receive a plurality of feedback signals from at least one of said first pitch controller and said second pitch controller; and
   determine when to transmit one of the first signal and the second signal to said first pitch controller and to said second pitch controller, respectively, based on the plurality of feedback signals.

10. A power generation system in accordance with claim 8, wherein each of said plurality of motor drives selectively receives one of the first signal and the second signal.

11. A power generation system in accordance with claim 10, wherein each of said plurality of motor drives selectively receives one of the first signal and the second signal based on a communication loss.

12. A power generation system in accordance with claim 8, wherein each of said first and second pitch controllers are configured to determine which one of said first pitch controller and said second pitch controller implements the pitch control command.

13. A power generation system in accordance with claim 12, wherein each of said first and second pitch controllers are configured to make the determination based on an assessment of the communication between each of said first and second pitch controllers and at least one of said turbine controller and said plurality of motor drives.

14. A power generation system in accordance with claim 13, wherein at least one of said first pitch controller and said second pitch controller transmits a signal representative of the implementation determination to said turbine controller.

15. A method for operating a power generation system, wherein the power generation system comprises a plurality of turbine blades coupled to a hub, a plurality of motors, and a plurality of motor drives, wherein each motor is coupled to a corresponding one of the plurality of turbine blades and to a corresponding one of the plurality of motor drives, said method comprising:
   generating, via a turbine controller, at least a first signal that is representative of a pitch control command to change a pitch angle of the plurality of turbine blades and a second signal that is representative of the pitch control command;
   transmitting the first signal to a first pitch controller that is coupled to the turbine controller, wherein the first pitch controller is configured to implement the pitch control command by transmitting a corresponding primary motor drive signal to each of the plurality of motor drives in response to receiving the first signal; and
   transmitting the second signal to a second pitch controller that is coupled to the turbine controller and to the first pitch controller, wherein the second pitch controller is configured to implement the pitch control command by transmitting a corresponding secondary motor drive signal to each of the plurality of motor drives in response to receiving the second signal when the first pitch controller is unable to implement the plurality of pitch control commands.

16. A method in accordance with claim 15, wherein transmitting the second signal further comprises transmitting the second signal to the second pitch controller simultaneously with the first signal.

17. A method in accordance with claim 15, further comprising receiving, selectively, one of the first signal and the second signal by the plurality of motor drives that are each coupled to the first pitch controller and to the second pitch controller.

18. A method in accordance with claim 17, wherein receiving, selectively, one of the first signal and the second signal further comprises receiving, selectively, one of the first signal and the second signal based on a communication loss.

19. A method in accordance with claim 17, further comprising processing the first signal and the second signal via each of the plurality motor drives.

20. A method in accordance with claim 19, further comprising transmitting one of the processed first signal and the processed second signal to the plurality of motors.

* * * * *

UNITED STATES PATENT AND TRADEMARK OFFICE
CERTIFICATE OF CORRECTION

| | |
|---|---|
| PATENT NO. | : 8,916,988 B2 |
| APPLICATION NO. | : 13/658507 |
| DATED | : December 23, 2014 |
| INVENTOR(S) | : Ridgway et al. |

It is certified that error appears in the above-identified patent and that said Letters Patent is hereby corrected as shown below:

In the claims

In Claim 8, column 11, line 11, delete "drives:" and insert therefore -- drives; --.

Signed and Sealed this
Fourteenth Day of June, 2016

Michelle K. Lee
*Director of the United States Patent and Trademark Office*